United States Patent
Fu et al.

(10) Patent No.: US 9,811,130 B2
(45) Date of Patent: Nov. 7, 2017

(54) POWER MANAGEMENT CONTROL SYSTEM

(75) Inventors: Sheau-Wei J. Fu, Bellevue, WA (US);
Kamiar J. Karimi, Kirkland, WA (US);
Mehran Mesbahi, Seattle, WA (US);
Daniel Zelazo, Haifa (IL)

(73) Assignee: The Boeing Company, Chicago, IL (US)

( * ) Notice: Subject to any disclaimer, the term of this patent is extended or adjusted under 35 U.S.C. 154(b) by 913 days.

(21) Appl. No.: 13/611,999

(22) Filed: Sep. 12, 2012

(65) Prior Publication Data

US 2013/0297089 A1    Nov. 7, 2013

Related U.S. Application Data

(60) Provisional application No. 61/533,345, filed on Sep. 12, 2011.

(51) Int. Cl.
*G06F 1/26* (2006.01)
*H02J 3/00* (2006.01)
(Continued)

(52) U.S. Cl.
CPC ........... *G06F 1/26* (2013.01); *G06Q 50/06* (2013.01); *H02J 3/14* (2013.01); *H02J 3/387* (2013.01);
(Continued)

(58) Field of Classification Search
CPC ..... G06F 1/26; H02J 3/14; H02J 3/387; H02J 2003/143; H02J 2003/007; G06Q 50/06; Y02T 50/54
(Continued)

(56) References Cited

U.S. PATENT DOCUMENTS

| | | | | | |
|---|---|---|---|---|---|
| 5,467,265 A | * | 11/1995 | Yamada | ............... | F01K 13/02 |
| | | | | | 700/276 |
| 6,832,134 B2 | * | 12/2004 | Havlena | ............... | G05B 13/026 |
| | | | | | 700/291 |

(Continued)

FOREIGN PATENT DOCUMENTS

| | | |
|---|---|---|
| CN | 1166911 A | 12/1997 |
| CN | 101140004 A | 3/2008 |

(Continued)

OTHER PUBLICATIONS

Zelazo et al, "An energy management system for off-grid power systems", Energy Systems:Optimization, Modeling, Simulation, and Economic Aspects vol. 3, No. 2 Jan. 31, 2012 pp. 28.*

(Continued)

*Primary Examiner* — Miranda Huang
*Assistant Examiner* — Olvin Lopez Alvarez
(74) *Attorney, Agent, or Firm* — Toler Law Group, PC

(57) ABSTRACT

A system to control a power distribution system includes a system controller configured to determine an allocation of power during a first time period for each of a plurality of subsystems. The system also includes a subsystem controller communicatively coupled to the system controller. The subsystem controller is associated with a device and configured to receive power allocation data indicating the allocation of power for the device from the system controller. The subsystem controller is further configured to receive operation request data indicating a request to operate the device and produce a model operation of the device for a second time period based on the power allocation data, the operation request data, and a cost-utility function associated with the device. The subsystem controller is also configured to communicate, to the system controller, projected power (Continued)

demand data associated with the modeled operation of the device during the second time period.

20 Claims, 8 Drawing Sheets

(51) Int. Cl.
*H02J 3/14* (2006.01)
*G06Q 50/06* (2012.01)
*H02J 3/38* (2006.01)

(52) U.S. Cl.
CPC ... *H02J 2003/007* (2013.01); *H02J 2003/143* (2013.01); *Y02T 50/54* (2013.01)

(58) Field of Classification Search
USPC .................................................... 700/295
See application file for complete search history.

(56) References Cited

U.S. PATENT DOCUMENTS

| | | | |
|---|---|---|---|
| 6,925,363 B2* | 8/2005 | Hutton | H02J 3/14 307/31 |
| 7,286,910 B2* | 10/2007 | Marin-Martinod | H02J 1/14 307/11 |
| 7,702,931 B2* | 4/2010 | Goodrum | G06F 1/3203 700/295 |
| 7,752,150 B2* | 7/2010 | Ye | G06N 3/12 700/286 |
| 7,788,516 B2* | 8/2010 | Conroy | G06F 1/26 713/300 |
| 7,872,368 B2 | 1/2011 | Karimi et al. | |
| 8,005,580 B2 | 8/2011 | McAvoy | |
| 8,010,250 B2* | 8/2011 | Borumand | H02J 1/14 700/295 |
| 8,086,878 B2* | 12/2011 | Diab | H04L 12/10 713/300 |
| 8,260,652 B1* | 9/2012 | Silver | G06Q 10/06 705/308 |
| 8,446,040 B2* | 5/2013 | Paik | H02J 3/14 307/39 |
| 8,673,393 B2 | 3/2014 | Yuan et al. | |
| 8,676,393 B1* | 3/2014 | Hupton | H02J 3/14 307/24 |
| 2002/0059213 A1* | 5/2002 | Soga | H04Q 3/66 |
| 2004/0057177 A1 | 3/2004 | Glahn et al. | |
| 2004/0124703 A1* | 7/2004 | Tani | B60R 16/0315 307/10.1 |
| 2004/0221060 A1* | 11/2004 | Alicherry | H04L 41/145 709/238 |
| 2004/0257059 A1* | 12/2004 | Mansingh | H02J 3/00 324/76.11 |
| 2005/0121978 A1* | 6/2005 | McAvoy | H02J 3/14 307/43 |
| 2005/0137959 A1* | 6/2005 | Yan | G06Q 20/102 705/37 |
| 2006/0276938 A1* | 12/2006 | Miller | G06Q 50/06 700/295 |
| 2007/0191992 A1* | 8/2007 | Taliaferro | H02H 7/28 700/286 |
| 2008/0046387 A1* | 2/2008 | Gopal | G01D 4/004 705/412 |
| 2008/0114499 A1* | 5/2008 | Hakim | H02J 3/32 700/291 |
| 2008/0276209 A1* | 11/2008 | Albrecht | G06F 17/5031 716/113 |
| 2008/0313476 A1* | 12/2008 | Hansen | G06F 1/26 713/300 |
| 2009/0063257 A1* | 3/2009 | Zak | G06Q 30/0202 705/7.31 |
| 2009/0103221 A1 | 4/2009 | Aronson et al. | |
| 2009/0113221 A1* | 4/2009 | Holle | G06F 1/189 713/310 |
| 2010/0179704 A1* | 7/2010 | Ozog | G06Q 10/06315 700/291 |
| 2010/0198423 A1* | 8/2010 | Hirst | G01D 4/004 700/292 |
| 2010/0292854 A1* | 11/2010 | Burg | G06F 1/26 700/291 |
| 2011/0004358 A1* | 1/2011 | Pollack | B60L 11/1842 700/297 |
| 2011/0060495 A1* | 3/2011 | Kono | B60W 40/072 701/31.4 |
| 2011/0087381 A1* | 4/2011 | Hirato | H02J 3/32 700/291 |
| 2011/0153101 A1* | 6/2011 | Thomas | G06Q 10/04 700/291 |
| 2011/0231028 A1* | 9/2011 | Ozog | G06Q 10/06 700/291 |
| 2011/0307110 A1* | 12/2011 | Sharma | G06F 1/26 700/291 |
| 2012/0153725 A1* | 6/2012 | Grohman | H02J 3/14 307/39 |
| 2012/0166002 A1* | 6/2012 | Kim | H02J 3/14 700/291 |
| 2012/0173888 A1* | 7/2012 | Srebranig | G06F 1/3287 713/300 |
| 2012/0209442 A1* | 8/2012 | Ree | H04L 12/2803 700/295 |
| 2012/0226922 A1* | 9/2012 | Wang | G06F 1/3203 713/320 |
| 2012/0232728 A1* | 9/2012 | Karimi | H02J 3/38 701/22 |

FOREIGN PATENT DOCUMENTS

| | | | |
|---|---|---|---|
| CN | 101516695 A | 8/2009 | |
| CN | 101847868 A | 9/2010 | |
| CN | 102144344 A | 8/2011 | |
| EP | 0884821 A1 | 12/1998 | |
| EP | 1582458 A1 | 10/2005 | |
| EP | 2595012 A2 | 5/2013 | |
| WO | WO 2009/059370 | * 5/2009 | ............ G06Q 50/00 |

OTHER PUBLICATIONS

Shiina et al, "Stochastic Unit Commitment Problem", 2002, pp. 117-123.*
Nedic et al, "Subgradient Methods in Network Resource Allocation: Rate Analysis", 2008, pp. 1189-1194.*
Bertsekas, "Dynamic Programming and Optimal Control", Athena Scientific, Belmont, vol. I, Third edition, 2005, pp. 47.*
Gatsis et al, "Cooperative Multi-Residence Demand Response Scheduling", Mar. 2011, IEEE, pp. 6.*
Wang et al, "Short-Term Generation Scheduling With Transmission and Environmental Constraints Using an Augmented Lagrangian Relaxation", Aug. 1958, IEEE, pp. 1294-1301.*
Boyd et al, "Subgradient Methods", Apr. 13, 2008, pp. 27.*
Extended European Search Report for App No. 13183474.9, dated Jul. 30, 2014, 11 pages.
Zelazo, D. et al., "An Energy Management System for Off-Grid Power Systems," Energy Systems: Optimization, Modeling, Simulation, and Economic Aspects, vol. 3, No. 2, Jan. 31, 2012, 15 pages.
Communication pursuant to Article 9493) EPC for European Application No. 13183 474.9-1804, dated Oct. 26, 2015, (6 pages).
EPO, European Office Action, Application No. 13183474.9, issued Mar. 24, 2017, 9 pages.
Chinese Office Action, Application No. 2013104147316, mailed Apr. 25, 2017, 19 pages.

* cited by examiner

POWER MANAGEMENT CONTROL SYSTEM

CLAIM OF PRIORITY

The present application claims priority from U.S. Provisional Patent Application No. 61/533,345 filed Sep. 12, 2011 and entitled "OPTIMAL SOURCE AND LOAD MANAGEMENT FOR NEXT GENERATION AIRCRAFT POWER SYSTEMS," which is incorporated by reference herein in its entirety.

FIELD OF THE DISCLOSURE

The present disclosure is generally related to a power management control system.

BACKGROUND

A primary function of a vehicular power system is to generate, regulate, and distribute power (e.g., electricity) to vehicle systems. The vehicular power system may also be configured to provide safety guarantees in the presence of faults and other contingencies. Load and system management becomes increasingly complex as a number of vehicle power subsystems increases.

For complex systems (i.e., systems with many independent loads), power demand at a given time is difficult to predict. Certain prior control methods have focused on capabilities of generating units and have used load shedding as a means to avoid overload conditions and to maintain service to high priority loads. To implement load shedding, loads may be "ranked" according to a priority list and, when an overload condition is present or imminent, one or more loads may be shed (e.g., dropped or shut down) based on the priority list. Load shedding is easy to implement and requires little computational overhead; however, due to the simplicity of the load shedding process a configuration of loads and sources operated by a vehicular power system at a particular time may be sub optimal.

SUMMARY

Particular embodiments disclosed herein provide a power management control system that utilizes a dual decomposition method for distributed management of electric loads and sources of a power systems (e.g., a power distribution system), such as next generation "more electric" airplane power systems. The power management control system uses a scalable approach that treats a total energy usage of the power system over a finite time horizon as one or more sub-problems (e.g., computations) for each unit (e.g., subsystem or device) of the power system. The sub-problems for each unit are solved individually, e.g., via a shortest path algorithm, and are subsequently coordinated using an algebraic update rule, such as a sub-gradient update rule, to iteratively obtain source and load allocation. The source and load allocation obtained in this manner may be optimal or near optimal. Accordingly, the power management control system may coordinate multiple units (e.g., a source device, a load device, or a combination thereof), each having distinct behaviors, in a manner that results in collective efficient operation of all of the units.

For example, to schedule loads and sources of a power system, cost-utility functions (e.g., mathematical structures) are generated that mathematically model (e.g., represent) an operational cost of generating power for each source device and/or a utility (or negative cost) of operating each load device. The cost-utility functions are designed to reduce operating and generating costs while simultaneously increasing utility (e.g., functionality) of the power system. The cost-utility functions for all units of the power system are combined to balance (e.g., optimize) operation of all units in the power system over the finite time horizon.

The power management control system may include a system controller and one or more sub-system (or device) controllers. The cost-utility functions for each device may be distributed to a corresponding sub-system controller. Each sub-system controller receives data indicating an amount of allocated power from the system controller. The sub-system controller uses the data indicating the allocated power as an input to solve its cost-utility function, e.g., using a shortest path technique, to schedule operation of one or more associated devices (e.g., a source device, a load device, or a combination thereof). The system controller receives an indication of each cost-utility function and uses a sub-gradient update rule to determine and update an allocation of power of one or more devices (e.g., the source device, the load device, or a combination thereof).

In an alternative embodiment, the system controller solves the cost-utility functions for each sub-system or device, e.g., using the shortest path technique, and issues one or more commands to the sub-system controllers in accordance with the sub-gradient update rule based on each of the shortest path solutions.

In an embodiment, a system includes a system controller configured to determine an allocation of power during a first time period for each of a plurality of subsystems. The system also includes a subsystem controller communicatively coupled to the system controller. The subsystem controller is associated with a device and is configured to receive power allocation data indicating the allocation of power for the device from the system controller. The subsystem controller is further configured to receive operation request data indicating a request to operate the device and to model operation of the device for a second time period based on the power allocation data, the operation request data, and a cost-utility function associated with the device to produce a modeled operation of the device. The subsystem controller is also configured to communicate, to the system controller, prior to the second time period, projected power demand data associated with the modeled operation of the device during the second time period.

In another embodiment, a method includes determining an allocation of power for each of a plurality of subsystems. Each of the plurality of subsystems is associated with at least one corresponding device. The method also includes generating power allocation data indicating the allocation of power for a particular subsystem of the plurality of subsystems and receiving operation request data indicating a request to operate a device of the particular subsystem. The method also includes modeling operation of the device based on the power allocation data, the operation request data, and a cost-utility function associated with the device to produce a modeled operation of the device. The method additionally includes identifying projected power demand data associated with the modeled operation of the device.

In another embodiment, a non-transitory computer-readable medium includes instructions that, when executed by a processor, cause the processor to determine an allocation of power for each of a plurality of subsystems. Each of the plurality of subsystems is associated with at least one corresponding device. The instructions also cause the processor to generate power allocation data indicating the allocation of power for a particular subsystem of the plurality of subsystems. The instructions also cause the processor to receive operation request data indicating a request to operate a device of the particular subsystem and to model operation of the device based on the power allocation data, the operation request data, and a cost-utility function associated with the device to produce a modeled operation of the device. The instructions additionally cause the processor to identify projected power demand data associated with the modeled operation of the device.

One particular advantage provided by at least one of the disclosed embodiments is that one or more devices of a power system (e.g., a self-contained power system, such as an aircraft) may be scheduled by a power management control system. The power management control system may distribute one or more cost-utility functions to sub-system controllers of the power management control system to enable parallelization of the computations across multiple sub-system controllers, which may result in faster computation time, increased scalability, and system modularity.

The features, functions, and advantages that have been described can be achieved independently in various embodiments or may be combined in yet other embodiments, further details of which are disclosed with reference to the following description and drawings.

DETAILED DESCRIPTION

A power management control system of a power distribution system may operate to determine a schedule and commitment level for each generating unit (e.g., a source device) and load unit (e.g., a load device). For example, the power management control system may be structured as a high level tier (e.g., a global optimizer) and a lower tier (e.g., local processors) associated with one or more generating unit or load unit. A system controller (e.g., the global optimizer) of the power management control system may determine and allocate power resources of the power distribution system such that the running (e.g., operating) cost of the generating units is reduced and the utility of the load units is increased.

To maintain an aggregate power balance (e.g., a total generated power that is greater than or equal to a total consumed power), a sub-system controller associated with each generating unit (e.g., the source device) and each operating unit (e.g., the load device) may perform calculations and operate each unit in accordance with each unit's own operating constraints based on a mathematical function that represents the respective generating unit or operating unit. In this manner, computation (e.g., processing calculations) is parallelized and distributed across multiple units (e.g., source devices and/or load devices) of the power distribution system. Each sub-system controller may communicate computation results (e.g., solution information) to the system controller. In a particular embodiment, the communicated computation results include projected power demand data and the system controller receives the projected power demand data from each of multiple subsystem controllers. The system controller combines the computation results and determines an updated allocation of power resources of the power distribution system to be communicated to the subsystem controllers. For example, the system controller may allocate (or update an allocation of) power based on a total power consumed during a first time period by loads of a power distribution system (e.g., an upper power demand constraint), a power demand associated with each of one or more loads of the power distribution system (e.g., a lower power demand bound), and a power output associated with each of one or more sources of the power distribution system (e.g., an upper output bound).

Figure 1:
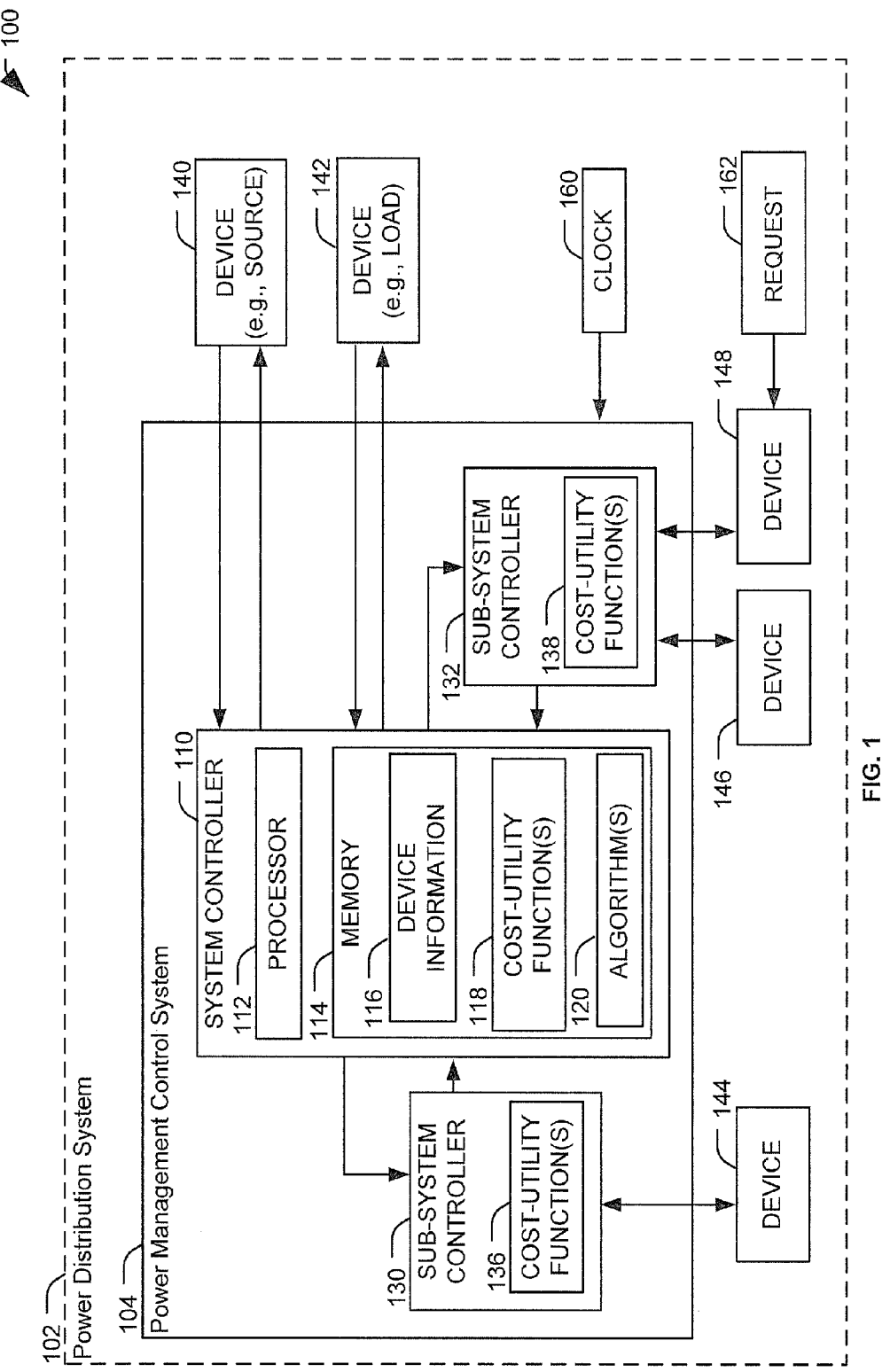
FIG. 1 illustrates a particular embodiment of a power management control system.

FIG. 1 illustrates a particular embodiment of a power system 100. The power system 100 may include a power distribution system 102. The power distribution system 102 may include an electrical power system of a vehicle, such as an aircraft, a boat, an automobile, a satellite, or another substantially self-contained power system (e.g., an oil platform). The power distribution system 102 may include a power management control system 104, one or more devices 140-148, and a clock 160. The power management control system 104 may be communicatively coupled to each of the one or more devices 140-148. The power management control system 104 may be configured to manage the devices 140-148 such that loads and sources of the power distribution system 102 are managed and controlled to avoid overload conditions and to efficiently use resources.

The devices 140-148 may include source devices, load devices, or a combination thereof. For example, a device 140 may include a source device, such as an engine driven alternating current (AC) generator, an auxiliary power unit (APU), a battery, external power, a non-traditional source of power generation, such as a fuel cell or a capacitor (e.g., a super capacitor or an ultra-capacitor).

As another example, the device 142 may include a load device, such as galley units (e.g., ovens, microwaves, refrigerators, coffee makers, etc.), environmental control systems, passenger entertainment systems, de-icing systems, actuators, lighting systems, avionics, heating, flight safety systems, flight control systems, etc. It may be appreciated that a number of load devices and a type of load devices may vary between different types of power distribution systems 102. For example, a power distribution system of an aircraft may include more, fewer, or different load or source devices than a power distribution system of an automobile.

One or more of the devices 140-148 may receive a request associated with a desired operation of the devices 140-148. For example, the device 148 may receive a request 162 that requests the device 148 to perform a particular operation associated with functionality of the device 148. In a particular embodiment, the request 162 includes an operational set point (e.g., operational parameters or desired operating characteristics) associated with the device. The request 162 may be received at a user interface of the device 148 (e.g., a user input), such as a graphical user interface (GUI), may be generated by the device 148 as part of a normal operation of the device 148, may be received from another device (e.g., the device 140), or may be generated by a sub-system controller (e.g., a sub-system controller 132) associated with the device 148. The request 162 may be forwarded to the sub-system controller 132 to enable the sub-system controller 132 to attempt to schedule operation of the device 148.

In the power distribution system 102, some loads may be scheduled (e.g., a schedulable unit) and some may not be scheduled (e.g., a non-schedulable unit). For example, loads that may not be scheduled (i.e., non-schedulable loads) include critical loads, such as control systems (e.g., flight controls), safety systems (e.g., life support systems, emergency lighting, flight safety systems, airbag systems), etc. Schedulable loads may include loads deemed not critical to operation of the power system 100, such as certain environmental systems, galley units, entertainment systems, convenience systems, etc.

The power management control system 104 may include a system controller 110 and one or more sub-system controllers 130-132. The system controller 110 may be coupled to each of the sub-system controllers 130-132. The system controller 110 may also be coupled to the devices 140-148 either directly or via one of the sub-system controllers 130-132. In a particular embodiment, the system controller 110, the devices 140-148, the sub-system controllers 130-132, or a combination thereof, are communicatively coupled via a communication bus (not shown). The communication bus may include a wired communication bus, a wireless communication bus, or a combination thereof.

The system controller 110 may include a processor 112 and a memory 114. The processor 112 may be configured to access the memory 114 and to communicate with each of the sub-system controllers 130-132, the devices 140-148, or a combination thereof. For example, the processor 112 may be configured to access cost-utility functions 118, algorithms 120, or a combination thereof, from the memory 114, and to perform one or more calculations based on the cost-utility functions 118, the algorithms 120, or both.

The memory 114 may include device information 116, the cost-utility function(s) 118, and the algorithms(s) 120. The device information 116 may include data associated with at least one of the one or more devices 140-148 of the power distribution system 102. For example, the device information 116 may include a device identifier (e.g., device ID) and one or more operating parameters or characteristics (e.g., power limits, thresholds, power usage rates, power generation rates, etc.) associated with each of the devices 140-148.

The cost-utility functions 118 may include a cost-utility function corresponding to at least one of the devices 140-148. In a particular embodiment, the cost-utility functions 118 include at least one cost-utility function for each device 140-148 included in the power distribution system 102. A cost-utility function may be associated with an operation of a particular device 140-148. In a particular embodiment, the system controller 110 includes cost utility functions for at least the device 140 and the device 142.

Each cost-utility function may correspond to a particular device (e.g., a particular load or source) of the devices 140-148 and may represent one or more operations of the particular device during multiple time periods. Alternatively or in addition to, each cost-utility function may correspond to a particular device type associated with each of the devices 140-148. In a particular embodiment, a particular cost-utility function includes an optimization model having one or more formulas to represent the particular device. A shortest path method may be used to solve the particular cost-utility function based on one or more variables (e.g., multipliers) and to provide an optimal solution for operating the particular device during a subsequent time period of the multiple time periods. The shortest path method may be configured to calculate multiple paths for a particular device to solve the particular cost-utility function. Each of the multiple paths may include a corresponding cost, and the shortest path method may select the optimal solution as a path having a lowest cost (e.g., a lowest cost path). In a particular embodiment, a cost of the lowest cost path of the particular device is estimated based at least partially on power allocation data, one or more variable (e.g., multipliers), a request to operate the particular device, or a combination thereof. The cost-utility functions 118 are described in greater detail with reference to FIGS. 3-5.

The algorithms 120 may include one or more algorithms to manage and control power within the power distribution system 102. For example, the algorithms 120 may include a dual decomposition algorithm including a shortest path algorithm and a subgradient algorithm. The shortest path algorithm may be used to solve the cost-utility functions 118 and/or a shortest path diagram based on one or more variable (e.g., multipliers). The subgradient algorithm may be used to calculate and update the one or more variables based on solutions to the cost-utility functions 118. In this manner, the power management control system 104 may use the dual decomposition algorithm and may iteratively alternate between the shortest path algorithm and the subgradient algorithm to schedule the devices 140-148 and to achieve an optimal, near optimal, or improved allocation of power resources to each of the sub-system controllers 130-132, each of the devices 140-148, or a combination thereof. In a particular embodiment, the system controller 110 determines an allocation of power using the subgradient algorithm (e.g., a subgradient optimization process).

The sub-system controllers 130-132 may each be communicatively coupled to the system controller 110 and configured to communicate data with the system controller 110. For example, each of the sub-system controllers 130-132 may receive power allocation data indicating an allocation of power to devices associated with the sub-system controllers 130-132, respectively. The sub-system controller 130 may include a cost-utility function 136 and may be associated with the device 144. The cost-utility functions 136 of the sub-system controller 130 may correspond to the device 144. That is, the cost-utility functions 136 may model cost and or utility associated with operation of the device 144. The sub-system controller 132 may include a cost-utility function 138 and may be associated with the device 146 and the device 148. The cost-utility functions 138 of the sub-system controller 132 may correspond to the device 146 and the device 148. That is, the cost-utility functions 138 may model cost and or utility associated with operation of the device 146 and/or the device 148. Each of the cost-utility functions 136-138 may store one or more functional models (e.g., shortest path diagrams), similar to the cost-utility functions 118 of the system controller 110, which are described in greater detail with reference to FIGS. 3-5. The shortest path diagram may be used to determine a lowest cost path for a particular device which determines one or more operational states of the particular device.

In a particular embodiment, the sub-system controllers 130-132 and/or the devices 140-148 may each include hardware and/or software that is configured to detect a failure or an underperformance of one of the devices 140-184. The hardware and/or software may be configured to communicate (e.g., signal) the system controller 110 to enable the system controller 110 to initiate one or more corrective actions (e.g., shut down, transfer operations, initiate backup systems, etc.) associated with the detected device.

The clock 160 may provide a common clock signal to the power management control system 104 to synchronize the system controller 110 and the sub-system controllers 130-132. In an alternative embodiment, the power management control system 104 may utilize the clock 160 and may operate asynchronously. In a particular embodiment, the system controller 110 and the sub-system controllers 130-132 each include a corresponding clock. The clock 160 enables the power management control system 104 to utilize a common time interval (e.g., a time period) during operation of the power management control system 104. For example, the system controller 110 and the sub-system controllers 130-132 may each perform respective calculations associated with the power distribution system 102 and communicate results associated with the calculations to the system controller 110 at least once every time period. In a particular embodiment, a duration of a time period is the same for the system controller 110 and the sub-system controllers 130-132. In an alternative embodiment, a time period of the sub-system controllers 130-132 may be a different duration than (e.g., shorter than or longer than) a time period of the system controller 110. Additionally, a time period of the sub-system controller 130 may be a different duration than (e.g., shorter than or longer than) a time period of the sub-system controller 132. In a particular embodiment, the system controller 110 uses two or more different time periods, such as a first time period during which first calculations (e.g., calculation associated with a subgradient algorithm) are performed and a second time period during which second calculations (e.g., calculations associated with a shortest path algorithm) are performed. In a particular embodiment, a duration of the first time period is different than (e.g., shorter than or longer than) a duration of the second time period.

In a particular embodiment, the power management control system 104 may reduce or minimize aggregate generation cost while concurrently increasing or maximizing aggregate load utility over a finite time horizon. For example, an energy optimization problem may be formulated for the power distribution system 102 in the form of equality and inequality constraints, together with an objective function, that may enable the power management control system 104 to employ distributed management of source devices and load devices (e.g., the devices 140-148). The power management control system 104 may manage (e.g., allocate power) and control operation of the power distribution system 102 by creating a power management problem and solving the power management problem using distributed optimization algorithms. The distributed optimization algorithms may be implemented such that computations are parallelized and distributed across multiple units (e.g., the system controller 110, the sub-system controllers 130-132, the devices 140-148, or a combination thereof) where each unit can perform its own computation to reduce a size and a complexity of the power management problem. Results (e.g., one or more operating states based on a lowest cost path) of each device 140-148 may be communicated to the system controller 110. The system controller 110 may manage (e.g., update) the power allocated to each of the devices 140-148 based on the results. This distributed framework allows for different distribution architectures.

In a particular embodiment, the power management control system 104 may use a Lagrangian method or methods (e.g., algorithms), to control the power distribution system 102. For example, the power management control system 104 may solve an optimization problem to minimize an objective function $f(x)$ under equality constraint functions $h_i(x)=0$ ($i=1, \ldots, p$), where p is associated with a number of equality constraint functions, and inequality constraint functions $g_i(x) \leq 0$ ($i=1, \ldots, m$), where m is associated with a number of inequality constraint functions. The optimization problem may have a Lagrangian form of:

$$L(x,\lambda,\mu)=f(x)+\Sigma_{i=1}^{p}\mu_i h_i(x)+\Sigma_{i=1}^{m}\lambda_i g_i(x) \qquad \text{Equation (1)}$$

where $\mu_i$ and $\lambda_i$ are the Lagrangian multipliers. Note that in this context optimizing, minimizing, maximizing, and other similar terms refer to finding particular solutions to a power management problem and do not require absolute optimum, minimum, or maximum, respectively. For example, local optimum, minimum, or maximum may differ for effective operation of particular systems. As another example, approximate optimum, minimum, or maximum may differ to reduce computational burden or due to error inherent in computations (e.g., rounding error), communications (e.g., signaling error), controls (e.g., control error), etc.

In a particular embodiment, the objective function $f(x)$ represents the sum of utilities and costs associated with the devices 140-148 of the power distribution system 102. For example, the objective function $f(x)$ may represent a cost of operating a fuel cell or an oven, as well as a utility obtained by keeping a temperature of the oven at a given set-point (e.g., a desired temperature).

The equality constraint function $h_i(x)$ may represent a dynamic update for each of the devices 140-148, extracted from a dynamic model (e.g., a cost-utility function) corresponding to each of the devices 140-148. The equality constraint function $h_i(x)$ may also be used to represent additional power constraints of the system, such as a power balance constraint to maintain a power balance in the power distribution system 102. For example, the power balance may correspond to a power supplied (e.g., generated) being greater than or equal to a power consumed during a time period (e.g., an operation interval).

The inequality constraint function $g_i(x)$ may represent an operational constraint for each of the devices 140-148, such as a lower bound and an upper bound on an operational state of each of the devices 140-148, as well as system-wide power constraints that should be maintained, e.g., that a sum of total requested power is less than or equal to a predetermined upper bound. For example, the inequality constraint function $g_i(x)$ may include a lower power demand bound associated with each of one or more load devices and an upper power output bound associated with each of one or more source devices. The inequality constraint function $g_i(x)$ may also include an upper power demand constraint for a total power consumed during a particular time period. The allocation of power to each of the devices 140-148 during a second period subsequent to a first period may be determined based on the upper power demand bound for the first period such that an amount of power available (e.g., an amount of power generated) during the second time period is based on the upper power bound of the first period. In a particular embodiment, the system controller 110 may increase or decrease an upper power output bound for the second time period based on the upper power demand for the first period. For example, the system controller may activate or deactivate one or more source devices during the second time period based on the upper power demand for the first time period.

When the objective function f(x) and the constraint functions $h_i(x)$, $g_i(x)$ can be expressed in the summation form as:

$$f(x) = \Sigma_{k=1}^K f^k(x^k), \quad \text{Equation (2)}$$

$$g_i(x) = \Sigma_{k=1}^K g_i^k(x^k), \text{ and} \quad \text{Equation (3)}$$

$$h_i(x) = \Sigma_{k=1}^K h_i^k(x^k), \quad \text{Equation (4)}$$

Equation (1) may be decomposed into K sub-problems according to subvectors $x^k$, where k=1, . . . , K. In a particular embodiment, a value of K may correspond to a number of devices 140-148 of the power distribution system 102. For each sub-problem, the optimization problem may be solved by minimizing the following sub-functions $$L^k(\lambda, \mu) = \min_{x^k}(f^k(x^k) + \Sigma_{i=1}^P \mu_i h_i^k(x^k) + \Sigma_{i=1}^m \lambda_i h_i^k(x^k)) \quad \text{Equation (5)}$$

for a given pair of multipliers ($\lambda$, $\mu$), where $\lambda$ and $\mu$ are Lagrange multipliers. Summation of the above subproblems is a convex optimization problem which may be solved by a subgradient method (e.g., a subgradient optimization process). The subgradient method is an iterative procedure to gradually approach an optimal solution by finding the ascent direction for a dual decomposition problem. The subgradient method may be implemented by the power management control system 104 at the system controller 110. At each sequence j, the multipliers ($\lambda_j$, $\mu_j$) may be updated according to:

$$\lambda_{j+1} = \max(0, \lambda_j + \alpha_j g(x_j)), \mu_{j+1} = \mu_j + \alpha_j h(x_j) \quad \text{Equation (6)}$$

where $\alpha_j$ is associated with a value of a time period in a sequence of the power management control system 104. For example, the sequence may include a plurality of time periods (e.g., time steps or time intervals).

The system controller 110, the sub-system controllers 130-132, the devices 140-148, or a combination thereof, may calculate a solution individually for a given pair of multipliers ($\lambda$, $\mu$) based on one or more cost-utility functions 118, 136-138 and communicate the solution to the system controller 110. For example, the solution (e.g., an optimal solution) may be determined using a shortest path method for the defined sub-problem(s) (e.g., the cost-utility functions 118, 136-138) for each of the devices 140-148.

The multipliers ($\lambda$, $\mu$) may be numerical values that are associated with operating a device. For example, the multiplier $\mu$ may be associated with a sensitivity of using more or less power than is allocated to a device and the multiplier $\lambda$ may be associated with a sensitivity of a calculated cost based on a shortest path algorithm.

In a particular embodiment, the multiplier $\mu$, corresponding to the equality constraint function $h_i(x)$, may be a hard constraint (e.g., heavily weighted) and is applied to a calculated power to be used to capture a power balance of the power distribution system 102 (e.g., a total power of sources and loads have to balance out) so that a device (e.g., a sub-system controller) does not exceed an allocated amount of power.

In a particular embodiment, the multiplier $\lambda$, corresponding to the inequality constraint function $g_i(x)$, may be a soft constraint (e.g., lightly weighted) and is applied to a calculated cost of operating a device. The multiplier $\lambda$ may be considered as a price per unit of power, such that when the power balance indicates that there is more demand than available power, the deficit must be purchased at a cost of $\lambda$, whereas if the power balance indicated that there demand is less than or equal to the available power, the excess can be sold off at a rate of $\lambda$. Generally, the cost is expressed as a function of Lagrange multipliers and current states.

The system controller 110 may receive the solutions and use the subgradient method to update the Lagrangian multipliers. The updated Lagrange multipliers may be communicated to the system controller 110, the sub-system controllers 130-132, and the devices 140-148. The procedure of calculating optimal solutions using the shortest path method for each of the devices 140-148 and updating the Lagrangian multipliers may be repeatedly performed until a convergent solution is obtained that maintains stability of the power distribution system 102. For example, the multipliers ($\lambda$, $\mu$) may be calculated during each time period in the sequence and reported to the system controller 110, the sub-system controllers 130-132, and/or the devices 140-148 as part of power allocation data communicated by the system controller 110. The system controller 110, the sub-system controllers 130-132, and/or the devices 140-148 may calculate solutions during each time period in the sequence and report the solutions as part of power demand data communicated to system controller 110. In a particular embodiment, the multipliers ($\lambda$, $\mu$) calculated during a first time period of the sequence may be used by the system controller 110, the sub-system controllers 130-132, and/or the devices 140-148, during the first time period, to calculate a solution for each of the devices 140-148 during a second time period that is subsequent to the first time period. For example, the second time period may include a next time period after the first time period and a solution for each of the devices 140-148 may indicate an operational state of each of the devices 140-148 during the second time period.

Figure 2:
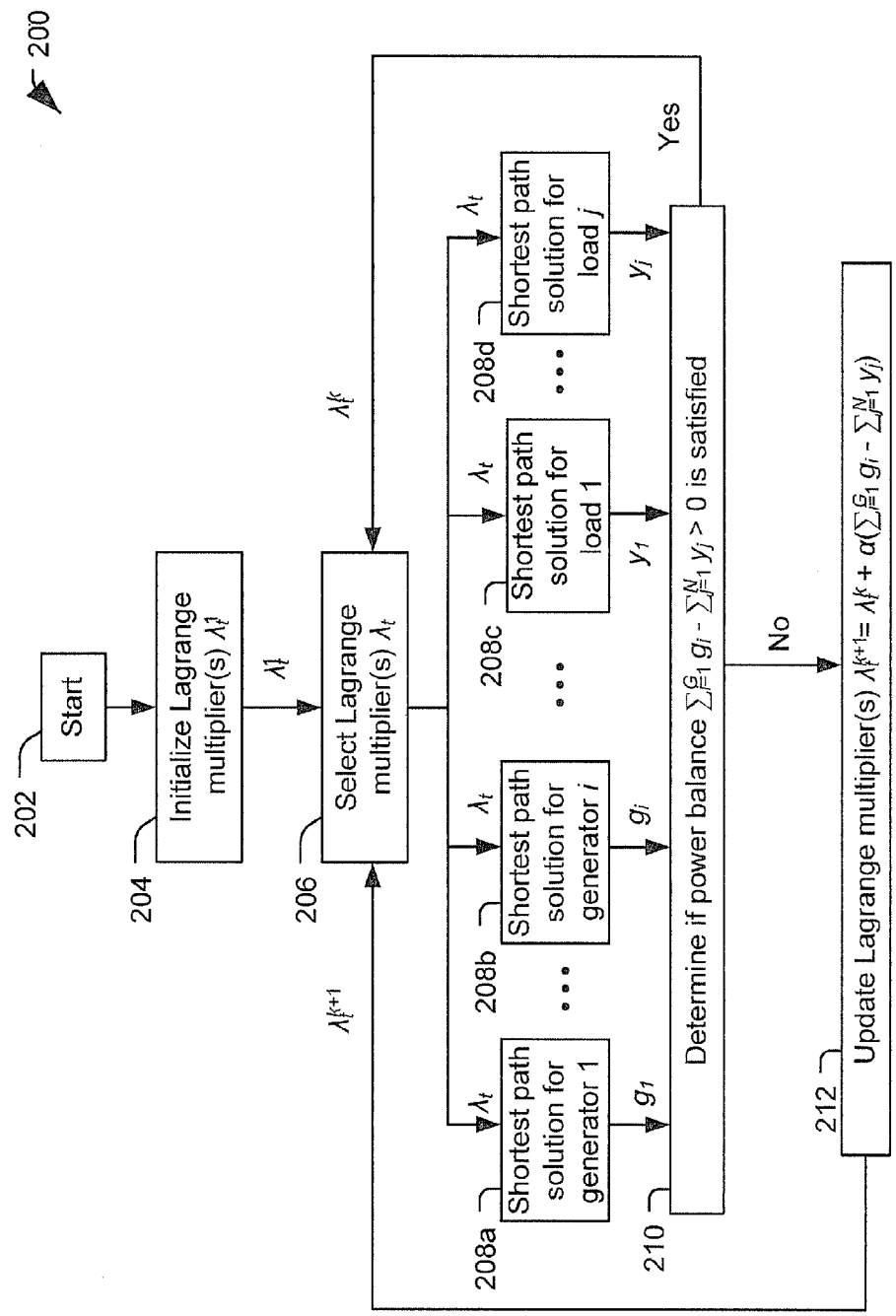
FIG. 2 illustrates a first particular embodiment of a method of controlling a power system.

Referring to FIG. 2, operation of the power system 100 using a method 200 to control the power distribution system 102 of FIG. 1. The method 200 may be implemented by the power management control system 104 to schedule one or more devices 140-148 of the power distribution system 102 of FIG. 1. The method 200 may including starting (e.g., initiating) a power management control system, at 202. Prior to or after the power management control system is started, the power management control system may be programmed with a dual composition algorithm including one or more shortest path algorithms and one or more subgradient algorithms. The power management control system may also be programmed with one or more cost-utility functions Lagrange multiplier(s) $\lambda_t^1$ may be initialized, at 204. In the method 200 of FIG. 2, k indicates a current time interval of a plurality of time intervals associated with the power management control system. The Lagrange multipliers $\lambda_t^1$ is associated with time interval k=1, as indicated by the superscript one (1) designating an initial time period (e.g., a first time period). For example, the system controller 110 may initialize the Lagrange multipliers to be distributed throughout the power management control system 104 of FIG. 1. In a particular embodiment, the Lagrange multipliers $\lambda_t$ may include the multipliers ($\lambda$, $\mu$) described with references to Equations (1)-(5).

Values of the Lagrange multiplier(s) $\lambda_t$ may be selected, at 206. The values of the Lagrange multipliers $\lambda_t$ may be selected as $\lambda_t^1$ when k=1. For values of k>1, $\lambda_t$ may be selected as one of $\lambda_t^k$ or $\lambda_t^{k+1}$ as described below. The selected values of the Lagrange multipliers $\lambda_t$ may be provided to one or more source devices 1-$i$ (e.g., generators) and one or more load devices 1-$j$ (e.g., loads). For example, the one or more source devices and the one or more load devices may include the devices 140-148 of FIG. 1.

A shortest path solution (e.g., a power level variable) for each of the one or more source devices 1-$i$ and the one or more load devices 1-$j$ may be determined at 208$a$-$d$. Each of the one or more source devices 1-$i$ and the one or more load devices 1-*j* may have a corresponding cost-utility function to which a shortest path algorithm is applied to calculate one or more shortest path solutions $g_{1-i}$ for the one or more source devices 1-*i*, respectively, and one or more shortest path solutions $y_{1-i}$ for the one or more load devices 1-*j*, respectively. For example, the system controller 110, the subsystem controllers 130-132, the devices 140-148 of FIG. 1, or a combination thereof, may determine the shortest path solution (based on the Lagrange multipliers $\lambda_t$) for each of the one or more source devices 1-*i* and the one or more load devices 1-*j*. The one or more shortest path solutions $g_{1-j}$, $y_{1-i}$ may be provided from the one or more source devices and the one or more load devices to a system controller, such as the system controller 110 of FIG. 1. The shortest path solution for a particular device may include a lowest cost path for the particular device. For example, each device may determine multiple paths that each correspond to an estimated cost based on an amount of allocated power and/or the Lagrange multipliers $\lambda_t$. The shortest path solution may be one of the multiple paths having a lowest cost. In a particular embodiment, a total of the one or more shortest path solutions $g_{1-i}$ for the one or more source devices 1-*i* may indicate a total power generated (e.g., an available amount of power) by the power distribution system for the time interval k. The one or more shortest path solutions $y_{1-i}$ for the one or more load devices 1-*j* indicates a total power consumed by the power distribution system for the time interval k.

A determination may be made whether a power balance condition is satisfied, at 210. For example, the determination may be made whether the total power generated by the power distribution system is greater than the total power consumed by the power distribution system. Where the total power generated is greater than the total power consumed, the method 200 selects the values of the Lagrange multipliers $\lambda_t$ for the next time interval k+1 as the values of the Lagrange multipliers $\lambda_t$ for the current time interval k, at 206.

Where the total power generated is not greater than the total power consumed, the values of the Lagrange multipliers $\lambda_t^{k+1}$ are updated, at 212. The values of the Lagrange multipliers $\lambda_t^{k+1}$ may be updated based on the values of the Lagrange multiplier $\lambda_t^k$ and a difference between the total power generated is not greater than the total power consumed multiplied by a constant α. In a particular embodiment a value of the constant α may be associated with a duration of the time interval k. The updated values of the Lagrange multiplier $\lambda_t^{k+1}$ may be selected as the values of the Lagrange multipliers $\lambda_t$ for the next time interval k+1, at 206. In a particular embodiment, determining whether the power balance condition is satisfied and updating the values of the Lagrange multipliers $\lambda_t^{k+1}$ may be performed as part of a subgradient algorithm executed by the control system 110 of FIG. 1.

Accordingly, the power system 100 of FIG. 1 and the method 200 of FIG. 2 enable a distributed method to schedule source devices and/or load devices in the power distribution system 102. Scheduling the source devices and the load devices may provide an efficient interaction between the source devices and the load devices that avoids overload conditions, reduces generation costs, and increases load utilities. A schedule and commitment level for each source device (e.g., generating unit) in the power distribution system 102 may be based a set of constraints, including reserve power, operating parameters, and forecasted loads over a finite time horizon. The schedule may enable power systems, such as an aircraft power system, to allocate power to effectively maintain critical loads (e.g., the avionics in an aircraft, the flight safety systems, etc.) while managing other non-critical loads (e.g., convenience systems) in a manner that offers flexibility in scheduling power consumption.

Figure 3:
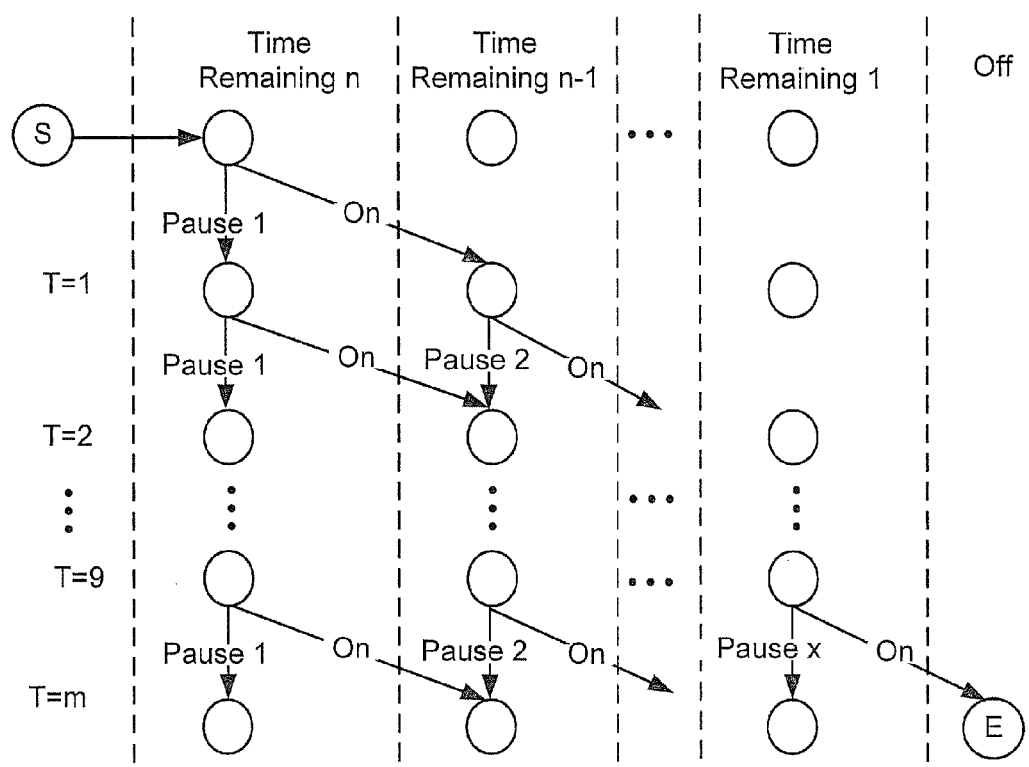
FIG. 3 illustrates a first illustrative embodiment of an exemplary representation of a shortest path diagram.
Figure 4:
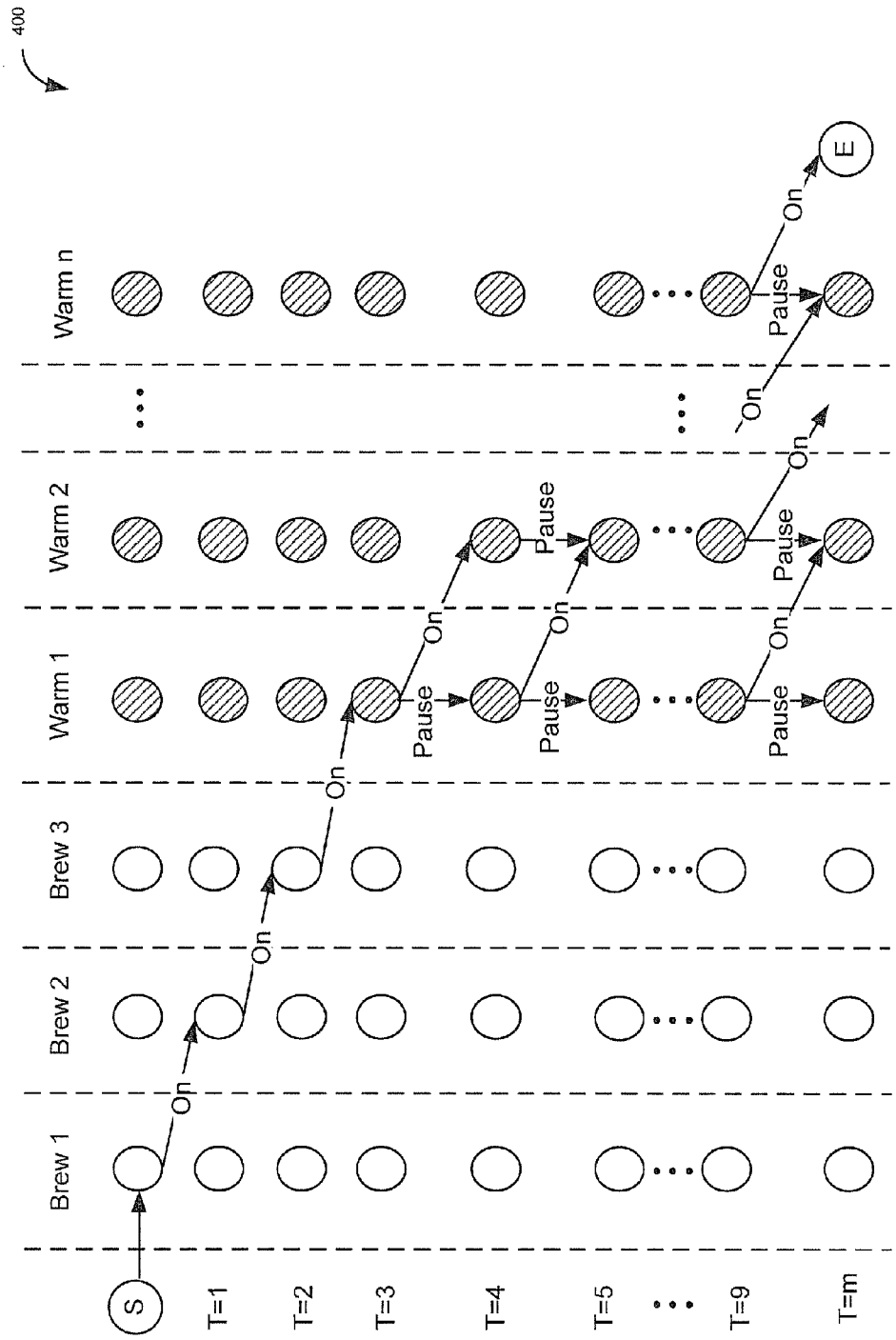
FIG. 4 illustrates a second illustrative embodiment of an exemplary representation of a shortest path diagram.
Figure 5:
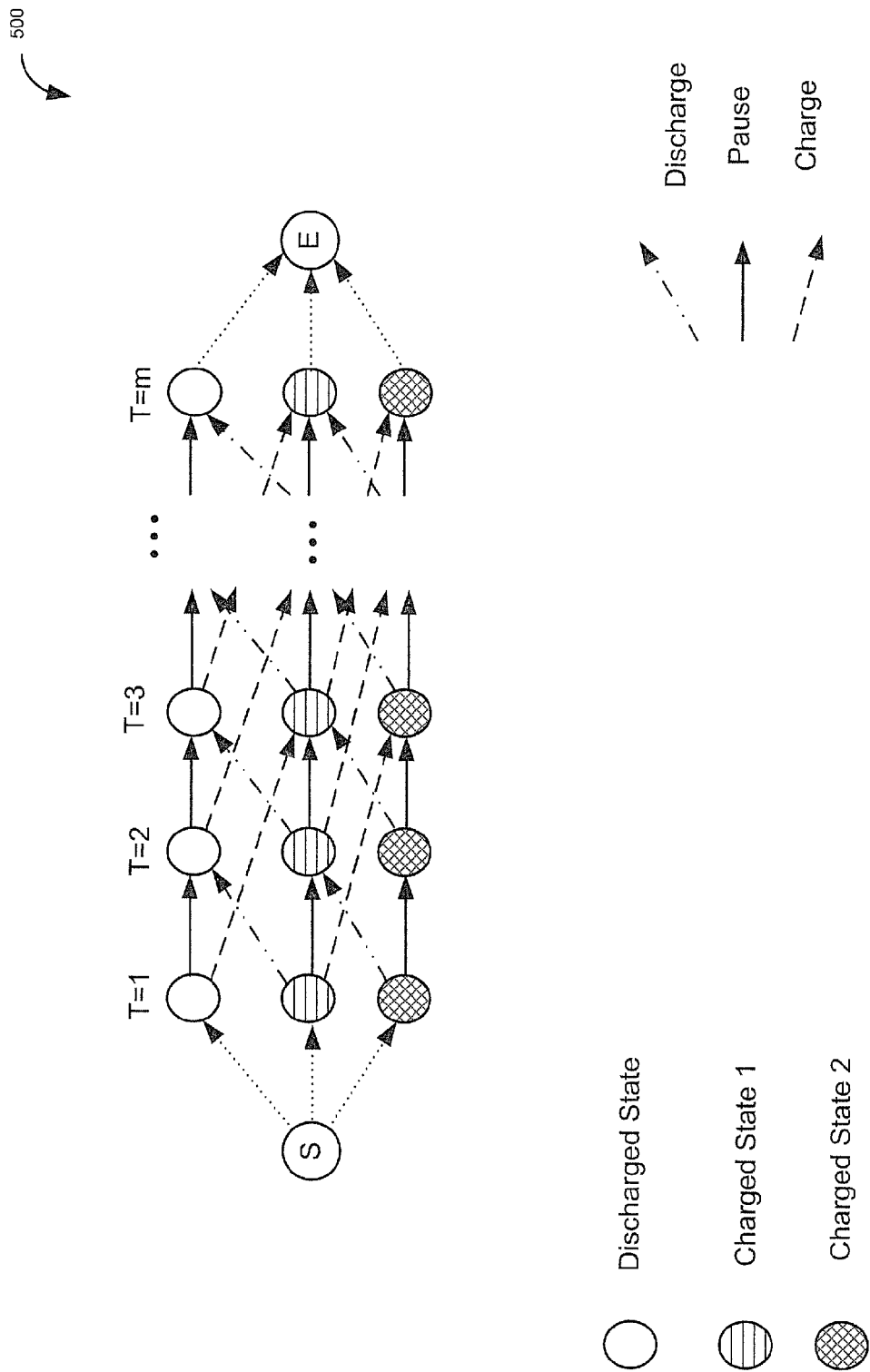
FIG. 5 illustrates a third illustrative embodiment of an exemplary representation of a shortest path diagram.

FIGS. 3-5 show examples of shortest path diagrams that may be used by a device in conjunction with a cost-utility function and/or a request to operate the device. A shortest path diagram may represent operations of the device over a finite (e.g., fixed) time period and enable an algorithm (e.g., a shortest path algorithm) to determine (e.g., calculate) a shortest path (e.g., a least costly path). For example, the shortest path algorithm may be used to estimate a lowest cost path from a current operational state (e.g., of a device) to a desired operational state indicated by a request (e.g., operational request data).

A cost-utility function may be associated with a device and provide a mathematical characterization of the device (e.g., source characteristics, load characteristics, or a combination thereof) during operation. For example, the device may be one of the devices 140-148 of FIG. 1. A device having source characteristics (e.g., a source device, such as a generator, fuel cell, capacitor, etc.) may be associated with a cost-utility function that characterizes the device based on output power level, a state variable (e.g., on, off, charged, discharged, etc.), a control variable (e.g., hold, charge, discharge, increase output power, decrease output power, shutdown, turn on, etc.), a cost (e.g., a penalty or an expense) of operating of the device (e.g., at a particular power level), or a combination thereof. Additional source characteristics may include an amount power available (e.g., able to be generated), a maximum power available (e.g., able to be generated), a cost coefficient to be used when power is generated below a preferred power output level, a cost coefficient to be used when power is generated in excess a preferred power level, a power output vector during a time period, a discharge rate (e.g., in kilo Volt-Amps (kVA) per second), a maximum charge rate, a warm-up (e.g., start-up) time period, a cost of power during the warm-up time period. The cost of operating the device may be associated with fueling the device, charging the device, operating the device in excess of desired (e.g., ideal) operating conditions, such as depleting a resource (e.g., fuel or stored charge) beyond a threshold or continuously operating the device beyond a threshold, a delay in operation, a duration of a rate of operation, an amount of power (e.g., resources) consumed, or a combination thereof.

A device having load characteristics (e.g., a load device, such as a light, an oven, an entertainment system, etc.) may be associated with a cost-utility function that characterizes the devices based on a power demand level, a state variable (e.g., on, off, heating, cooling, mixing, brewing, warming, etc.), a control variable (e.g., hold, heat, brew, warm, light, activate, deactivate, raise, lower, shutdown, turn on, etc.), and a utility (e.g., a benefit or desirability) of operating the device (e.g., at a particular power level). The utility of operating the device may be associated with operating the device at a given time or with a time element (e.g., a time criticality) such that the device completes an operation within a predetermined time period. Deviating from a time element (e.g., a failure to operate the device within a time period) may result in a penalty (e.g., a cost).

In a particular embodiment, some particular devices, such as capacitors have characteristics of both load devices (e.g., when charging) and of source devices (e.g., when discharging). Accordingly, a cost-utility function for a capacitor may include a source characteristic component and a load characteristic component.

A request, such as the request 162 of FIG. 1, may be generated to initiate operation of a particular device. For example, the request may indicate (e.g., define) one or more operational set points (e.g., operating characteristics or operating capabilities), such as a start time, a device identifier, an operational mode, a power level, a rate limit, power bounds (e.g., upper power limit, lower power limit, or a combination thereof), a time period of operation, a number of time intervals, an operating temperature, a number of operating states, a number of state change transitions, a duration for the device to operate in one or more operating states, a disutility costs (e.g., of deviating from one or more characteristics), etc. The disutility costs may be listed in a vector indicating an increasing value with time. In a particular embodiment, one or more of the above characteristics (e.g., capabilities) may be captured (e.g., included in) the cost-utility function associated with the device.

A shortest path diagram for a device may be generated based on the cost-utility function, the request, or a combination thereof. For example, in response to receiving the request to operate the device, the cost-utility function corresponding to the device may be selected (e.g., determined), and the shortest path diagram may be generated for the device.

Referring to FIG. 3, a first exemplary embodiment of a shortest path diagram is shown and generally designated 300. The shortest path diagram 300 may correspond to a device (e.g., an oven) and may represent operation of the device over time. The shortest path diagram 300 may include a vertical axis (e.g., a left most column) representing one or more time intervals (e.g., a plurality of time intervals). A horizontal axis (e.g., a top most row) may represent a number (n) of state transitions (e.g., steps) that the device may perform during the one or more time intervals (e.g., a total time period). Dashed lines represent edges between different operating states as indicated by the horizontal axis. A cost is associated with traversing each edge (e.g., to transition from one operating state to another operating state). A particular cost associated with a particular edge may be time-dependent, such that the particular cost changes (e.g., increases or decreases) with each time interval. In a particular embodiment, a utility gained by a particular transition is subtracted from the edge cost. The shortest path diagram 300 may include a "Start" node (labeled S) and an "End" node (labeled E) (e.g., a terminal node).

The states (e.g., operating states) of the device are represented by circles in FIG. 3. At each time interval in FIG. 3, two options are available when transferring from a first state to a next state. For example, a first opinion may include a "pause" transfer and a second option may include an "on" transfer. The cost of transferring from one state to the other states is assigned to the edges (e.g., the dashed lines). For example, the cost for "pause" option is different from the "on" option. Based in part on the cost of traversing each edge, a path from the start node (S) to the end node (E) may be determined. The path corresponds to a total cost of operating the device over the timing period.

The total cost may be determined using a shortest path algorithm. The shortest path algorithm may be a dynamic programming based solution strategy that aims to determine a total cost of operation for each unit via a decision tree (e.g., the shortest path diagram) that is traversed to reduce the total unit operational costs (or increase operating utilities). The shortest path algorithm may determine a plurality of paths that are each associated with a cost of achieving a result. Each cost may be determined based on an allocated amount of power, such as an allocated amount of power as indicated by one or more constraints (e.g., one or more Lagrange multipliers). For example, the shortest path algorithm may include a Djkstra's algorithm or Bellman-Ford algorithm.

The shortest path diagram 300 and the shortest path algorithm may be used in conjunction with the sub-gradient update algorithm described with reference to FIG. 1. For example, a cost associated with the shortest path diagram 300 may be based on one or more Lagrange multipliers (e.g., $\lambda$). An amount of power allocated to each device and/or the one or more Lagrange multipliers may be updated with each time interval. Accordingly, at a particular time interval, the shortest path algorithm is used, based on costs corresponding to the particular time interval to determine an operating state of the device during a next time interval based on a calculated shortest path. During the next time interval, one or more updated Lagrange multipliers are received (e.g., based on the sub-gradient algorithm) and used to modify (e.g., update) the costs, and the shortest path algorithm is again performed to determine a subsequent operating state of the device from a current operating state. Consequently, the shortest path solution may change at each iteration as a result of the updated costs and based on a current state of the device.

In a particular embodiment, the shortest path diagram 300 represents an operation of an oven (e.g., a steam oven) which has received a request to operate at three hundred degrees Fahrenheit for a time period (e.g., a plurality of time intervals) of one hour. Based on the time period included in the request and a cost-utility function corresponding to the oven, a number (n) of step (e.g., state transitions) have been determined to maintain the temperature for the entire time period that includes multiple time intervals. In a particular embodiment, the cost-utility function is used to generate a shortest path diagram based on a request to operate a device corresponding to the cost-utility function. Using a shortest path algorithm, operation of the oven is able to be scheduled over the time period.

Referring to FIG. 4, a second exemplary embodiment of a shortest path diagram is shown and generally designated 400. For example, the shortest path diagram 400 may be associated with a device, such as a coffee maker, that includes multiple operating states (e.g., a brew state and a warm state). The brew states may be associated with a brew mode and the warming states may be associated with a warming mode. The brew mode may not be broken as reflected in FIG. 4 where the states transfer from one brew stage to the next between adjacent time steps. The warming mode may be paused no more than three continuous time intervals so that a temperature does not drop too low due to a long pause in warming.

Referring to FIG. 5, a third exemplary embodiment of a shortest path diagram is shown and generally designated 500. The shortest path diagram 500 may be representative of a device that has multiple operating states and that may function as a source device and a load device. For example, the device may include a rechargeable battery or a capacitor (e.g., a super-capacitor). The shortest path diagram 500 may include three states corresponding to a discharged state, a first charged state (e.g., a half charged state), and a second charged state (e.g., a fully charged state). Although two charged states are shown in the shortest path diagram 500, more than or fewer than two charged states may be included in the shortest path diagram 500. In the shortest path diagram 500, a rate of discharge is different than a rate of charge. For example, the rate of discharge from the second charged state to the first charged state, or from the first charged state to the discharged state, occurs over one time interval. The rate of charge from the discharged state to the first charged state, or from the first charged state to the second charged state, occurs over two time interval. Thus, once the device has committed to charging, the device will not be available to discharge (or hold) until the next charged state is reached. Furthermore, a unit may "hold" its charge (e.g., pause) from one time interval to another time interval.

Figure 6:
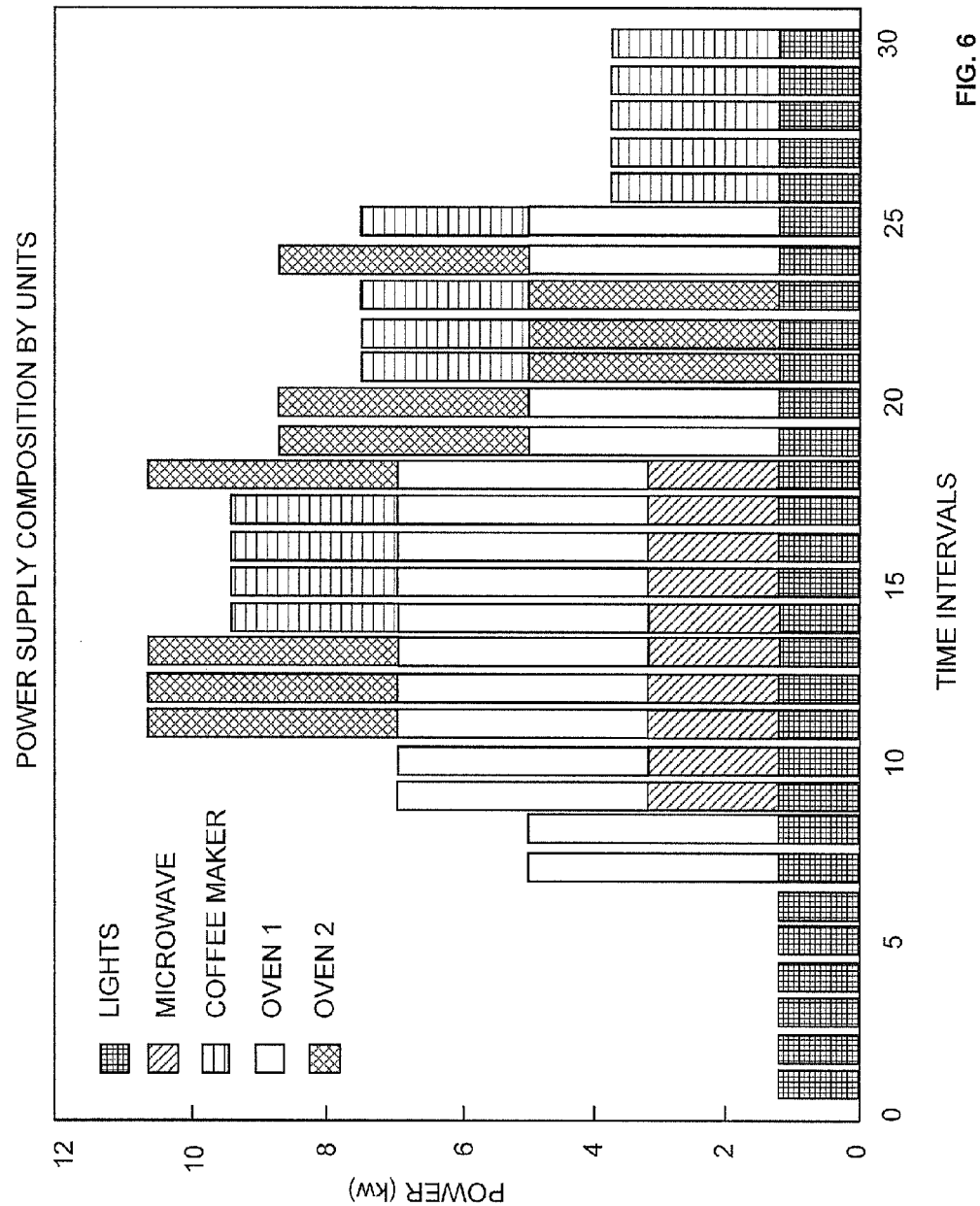
FIG. 6 illustrates a graph representing scheduled loads of a power system.

Referring to FIG. 6, a graph 600 is depicted that represents scheduled loads of a power system. For example, the power system may include the power system 100 of FIG. 1 and the loads may have been scheduled using the sub-gradient algorithm and the shortest path algorithm as described with respect to FIGS. 1-5.

The graph 600 may be representative of a power system or sub-system capable of providing eleven (11) kilowatts (kW) of power. The graph 600 shows power consumption for a plurality of time intervals (e.g., multiple time periods). When the power system cannot meet a total demand, one or more devices may be scheduled to find a solution having a lowest cost (based on the cost-utility function using a shortest path model). The power system may include multiple devices, such as lights, a microwave, a coffee maker, a first oven, and a second oven. Each device may be associated with a cost-utility function that characterizes the device (e.g., operating characteristics). For example, the multiple devices may be characterized as indicated in TABLE 1.

TABLE 1

DEVICE OPERATING CHARACTERISTICS

| Device Identifier | Power Required (kw) | Delay Cost | Operation On (time interval) | Operation Period (time interval) |
|---|---|---|---|---|
| Lights | 1.2 | Inf. | — | 30 |
| Microwave | 2 | Inf. | 10 | 13 |
| Coffee Maker | 2.5 | 0.06 | 13 | 20 |
| First Oven | 3.8 | [0.1, 0.5, 5000] | 16 | 25 |
| Second Oven | 3.8 | [0.12, 0.2, 5000] | 10 | 18 |

Referring to TABLE 1, each device is describes in terms of a device identifier, a power required in kilowatts (kW) (e.g., an amount of power consumed during each time interval), a delay cost (e.g., a cost associated with delaying an operation for at least one time interval), an operation on time intervals (e.g., how many time intervals a device is to be in an operating state), and an operational period time intervals (e.g., how many time intervals the device is allocated to achieve the operation on time interval value). A delay cost of infinity (inf.) may indicate that a corresponding device may be considered a critical device and a delay in operation is to be avoided. For example, a non-schedulable device (e.g., a non-schedulable unit) may not be optionally scheduled during a time interval, such as a first time interval subsequent to receiving a request to operate the particular device. The delay cost may also be indicated as a vector (e.g., as with the first oven and the second oven) that indicates increasing costs for multiple continuous delays. For example, a schedulable device (e.g., a schedulable unit) may be optionally scheduled during a time interval, such as a first time interval subsequent to receiving a request to operate the particular schedulable device, based on pre-defined constraints (e.g., the delay costs of TABLE 1). Referring to TABLE 1, the lights and microwave may be considered non-schedulable devices (e.g., non-schedulable units) because the delay cost associated with each device is infinity (inf.). The coffee maker, the first oven, and the second oven may be considered schedulable devices and may each be scheduled based in part on each device's corresponding delay cost (e.g., delay cost vector).

Given that the power system associated with the graph 600 may only provide 11 kW of power, all of the devices in TABLE 1 may not be operated as the same time. When all the devices are desired (e.g., requested) to be operated concurrently, the power system (e.g., a controller of the power system) may schedule (e.g., mediate or arbitrate) operation of the devices. In a particular embodiment, the non-schedulable devices are allocated power prior to the schedulable devices.

For example, requests to operate the devices included in TABLE 1 may have been received as follows: a lights request prior to time interval 1, a first oven request at time interval 6, a microwave request at time interval 8, a second oven request at time interval 10, a coffee maker request at time interval 11. As each request is received, the power system may evaluate cost-utility functions (based on TABLE 1) for each device to schedule the devices. For example, the power system (e.g., a controller or sub-system controller) may generate a shortest path diagram for each requested device and during each time interval, the power system (e.g., the controller) may perform a shortest path algorithm to determine an operating state during a next time interval. Scheduling the devices may enable the power system to avoid an overload condition.

Figure 7:
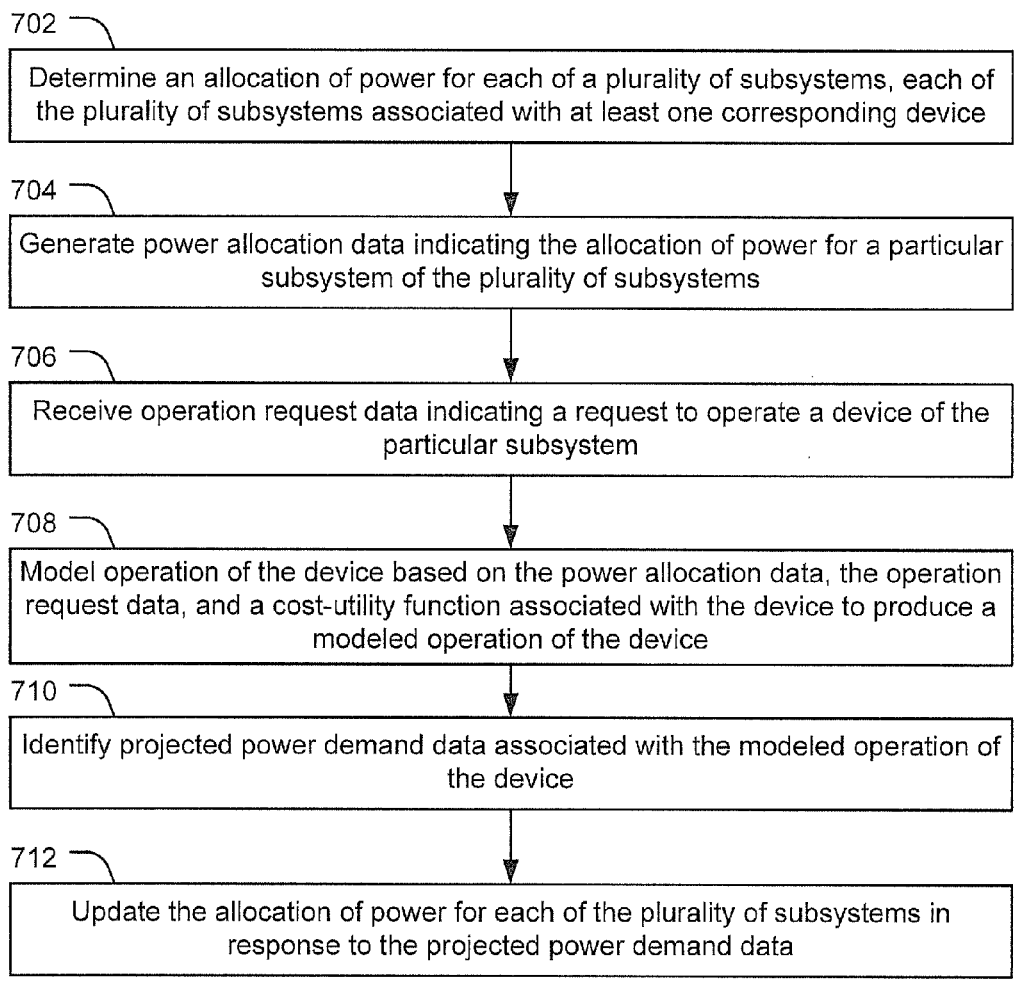
FIG. 7 illustrates a second particular embodiment of a method of controlling a power system.

FIG. 7 illustrates a method 700 of controlling a power system. For example, the power system may include the power distribution system 102 of FIG. 1. The method 700 includes determining an allocation of power for each of a plurality of subsystems, each of the plurality of subsystems associated with at least one corresponding device, at 702. For example, the system controller 110 of FIG. 1 may determine an allocation of power for each subsystem of the power distribution system 102. In a particular embodiment, the allocation of power may be based on a total amount of power available of the power system and the total power may be allocated to subsystems that include critical (e.g., non-schedulable) and non-critical (e.g., schedulable) loads. In another embodiment, the allocation of power may be based on a remaining amount of power available after power has been allocated to all critical loads. The remaining amount of power available may then be allocated to sub-systems including non-critical loads.

Power allocation data indicating the allocation of power for a particular subsystem of the plurality of subsystems is generated, at 704. For example, the power allocation data may be generated by the system controller 110 of FIG. 1.

Operation request data indicating a request to operate a device of the particular sub-system is received, at 706. For example, the device may include one of the devices 140-148 of FIG. 1.

Operation of the device is modeled based on the power allocation data, the operation request data, and a cost-utility function associated with the device to produce a modeled operation of the device, at 708, and projected power demand data associated with the modeled operation of the device is identified, at 710. The operation of the device may be modeled using a shortest path algorithm. The projected power demand data may be based on an operational state of the device as determined based on the shortest path algorithm. For example, the system controller 110 or one of the sub-system controllers 130-132 may determine a shortest path diagram for a particular device, (e.g., one of the devices 140-148) and, using a shortest path algorithm, may determine a next operating state the particular device. The projected power demand data calculated for each of the devices (e.g., the devices 140-148 of FIG. 1) may be provided to the system controller. In a particular embodiment, each of a plurality of sub-system controllers may provide projected power demand data calculated by the sub-system controller for each device associated with the sub-system controller.

The allocation of power for each of the plurality of subsystems may be updated in response to the projected power demand data, at 712. The allocation of power may be updated using a sub-gradient algorithm based on the projected power demand data. The updated allocation of power may be communicated to each of the plurality of subsystems as updated power allocation data.

In a particular embodiment, updating the allocation of power may include comparing a total power projected to be generated versus a total power projected to be consumed. For example, a system controller of the power system, such as the system controller 110 of the power distribution system 102 of FIG. 1, may determine a total power projected to be generated based on one or more source devices (e.g., generating devices) of the power system. The system controller may also determine a total power to be consumed based on the projected demand data generated by each subsystem. The system controller may determine whether the total power projected to be consumed is greater than or equal to the total power projected to be generated. Where the total power projected to be consumed is not equal to the total power projected to be generated, the system controller may initiate a source device (e.g., a generator, a fuel cell, a capacitor, etc.) to increase an amount of power provided or may reduce an amount of power allocated to a particular subsystem (e.g., a particular load).

The method 700 of FIG. 7 may enable the power system to allocate power to a plurality of subsystems in a manner that enables one or more devices of the power system to be scheduled, which may result in increased efficiency of the power system and a reduction (or elimination) of overload conditions.

Figure 8:
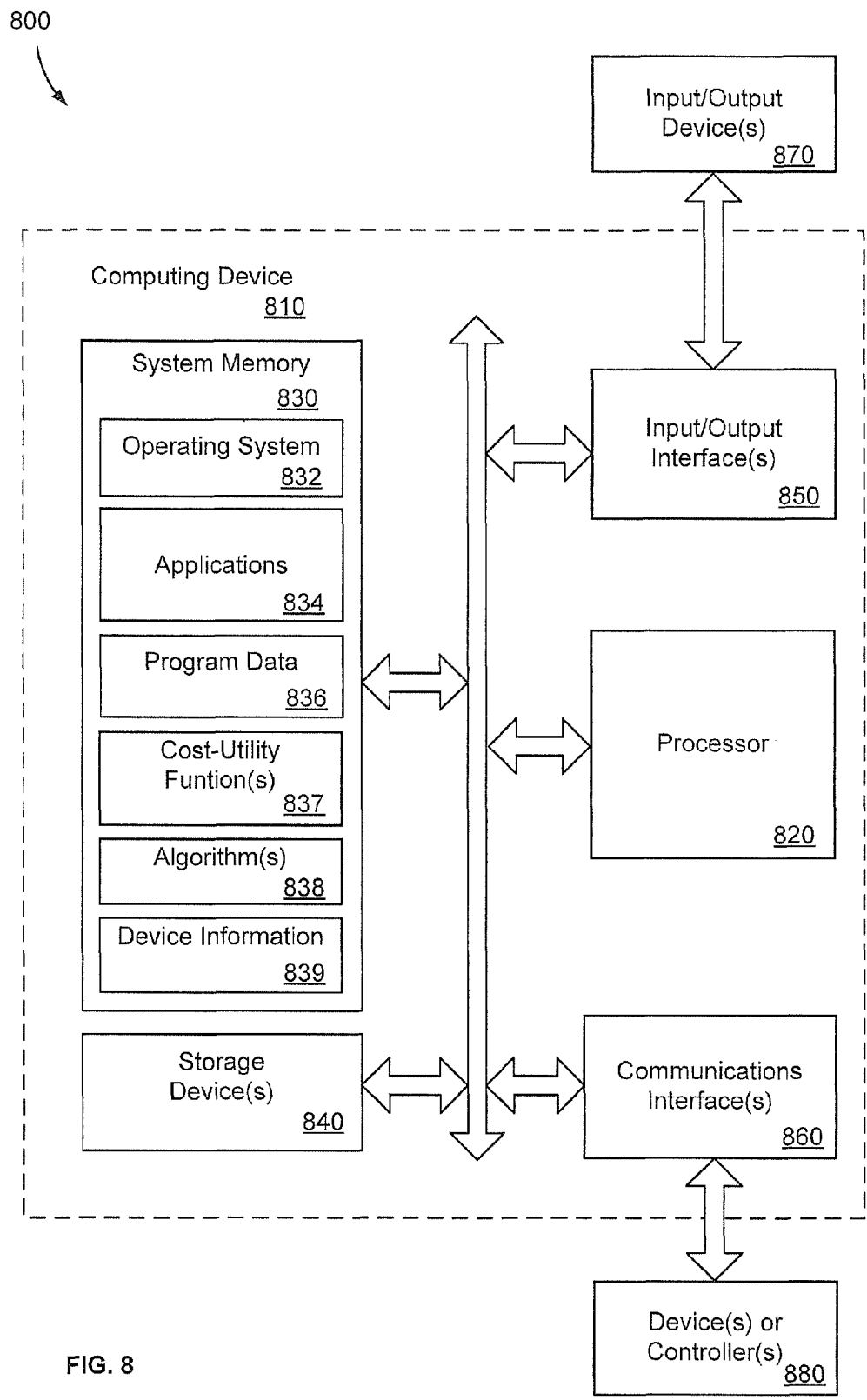
FIG. 8 illustrates a particular embodiment of a computing system, such as a controller of a power management control system.

FIG. 8 is a block diagram of a computing environment 800 including a general purpose computing device 810 operable to support communications. For example, the computing device 810, or portions thereof, may correspond to the system controller 110, the sub-system controllers 130-132, or the devices 140-148 of FIG. 1.

The computing device 810 may include at least one processor 820. Within the computing device 810, the at least one processor 820 may communicate with a system memory 830, one or more storage devices 840, one or more input/output interfaces 850, one or more communications interfaces 860, or a combination thereof.

The system memory 830 may include volatile memory devices (e.g., random access memory (RAM) devices), nonvolatile memory devices (e.g., read-only memory (ROM) devices, programmable read-only memory, and flash memory), or both. The system memory 830 may include an operating system 832, which may include a basic input/output system for booting the computing device 810 as well as a full operating system to enable the computing device 810 to interact with users, other programs, and other devices. The system memory 830 may also include one or more applications 834, program data 836, cost-utility function(s) 837, algorithm(s) 838, and device information 839. For example, the cost-utility functions 837, the algorithms 838, and the device information 839 may include the cost-utility functions 118, 136-138, the algorithms 120, and the device information 116 of FIG. 1, respectively. The cost-utility functions 837 may be associated with one or more devices coupled to the computing device 810, each of which may be identified by the device information 839. The algorithms 838 may include a shortest path algorithm, a sub-gradient algorithm, or a combination thereof, that may each be executed by the at least one processor 820. The program data 836 may include data used by the applications 834 to perform respective functions of the applications 834.

The at least one processor 820 may also communicate with one or more storage devices 840. For example, the one or more storage devices 840 may include nonvolatile storage devices, such as magnetic disks, optical disks, or flash memory devices. The storage devices 840 may include both removable and non-removable memory devices. The storage devices 840 may be configured to store an operating system, applications and program data. In a particular embodiment, the system memory 830, the storage devices 840, or both, include tangible, non-transitory computer-readable media. The storage devices 840 may store data used by one or more of the applications 834.

The at least one processor 820 may also communicate with one or more input/output interfaces 850. The one or more input/output interfaces 850 may enable the computing device 810 to communicate with one or more input/output devices 870 to facilitate user interaction. For example, the one or more input/output interfaces 850 may be adapted to receive input from the user, to receive input from another computing device, or a combination thereof. The input/output interfaces 850 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 870 may include user interface devices and displays, including some combination of buttons, keyboards, pointing devices, displays, speakers, microphones, touch screens, and other devices.

The at least one processor 820 may communicate with other computer systems 880 and/or other devices via the one or more communications interfaces 860. The one or more communications interfaces 860 may include wired Ethernet interfaces, IEEE 802 wireless interfaces, Bluetooth communication interfaces, electrical, optical or radio frequency interfaces, or other wired or wireless interfaces. The other computer systems 880 may include host computers, servers, workstations, portable computers, telephones, tablet computers, or any other communication device or component. For example, the other computer systems 880 may include the system controller 110 or the sub-system controllers 130-132 of FIG. 1.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

What is claimed is:

1. A system comprising:
a system controller configured to:
receive power allocation data indicating an allocation of power to a plurality of devices associated with the system controller;
receive a cost-utility function for each device of the plurality of devices, each cost-utility function including a model representing one or more operations of a corresponding device over a time period of multiple time periods, and wherein each cost-utility function includes a first multiplier and a second multiplier;
after reception of the power allocation data and the cost-utility function and during a first time period of the multiple time periods:
receive operation request data indicating a request to operate a device of the plurality of devices; and
in response to reception of the request to operate:
model operation of the plurality of devices to generate a set of results for a second time period of the multiple time periods, wherein operation of each device of the plurality of devices is modeled based on the power allocation data, the operation request data, and each cost-utility function, and wherein the first multiplier has a first value corresponding to the first time period and the second multiplier has a second value corresponding to the first time period;
adjust the first multiplier from the first value to a third value associated with the set of results, the third value corresponding to the second time period;
adjust the second multiplier from the second value to a fourth value associated with the set of results, the fourth value corresponding to the second time period; and
schedule for the second time period, based upon the first multiplier and the second multiplier, operation of at least the device.

2. The system of claim 1, wherein the first multiplier corresponds to a sensitivity of using more or less power than is allocated to the device, and wherein the second multiplier corresponds to a sensitivity of a price per unit of power.

3. The system of claim 2, wherein the system controller is further configured to schedule operation of a plurality of power generators of the plurality of devices based on modeling operation of the plurality of power generators, wherein operation of each power generator is based on a cost function associated with the power generator, and wherein each cost function includes the first multiplier.

4. The system of claim 3, wherein the system controller is further configured to:
determine a particular demand for each load device of a plurality of load devices of the plurality of devices based on a corresponding modelled operation of the load device, wherein operation of each load device is based on a utility function associated with the load device, and wherein each utility function includes the second multiplier; and
determine a particular supply for each power generator of the plurality of power generators based on a corresponding modelled operation of the power generator.

5. The system of claim 4, wherein the system controller is further configured to compare an aggregated demand of the plurality of load devices and an aggregated supply for the plurality of power generators, and wherein the plurality of devices are associated with a power distribution system that comprises a vehicular power distribution system of a vehicle.

6. The system of claim 5, wherein a first load device of the plurality of load devices is scheduled to be disabled during the second time period in response to determining that the aggregated demand is greater than the aggregated supply, wherein a second load device of the plurality of load devices is scheduled to be active during the second time period, and wherein the first load device has a lower utility during the first time period than the second load device.

7. The system of claim 5, wherein the vehicle comprises one of an aircraft and a spacecraft.

8. The system of claim 4, wherein the system controller is further configured to:
receive an indication that at least one device of the plurality of devices has malfunctioned; and
initiate a corrective action associated with the at least one device based on the indication.

9. The system of claim 2, wherein the second multiplier comprises a function of a cost associated with the first multiplier.

10. A method comprising:
receiving power allocation data indicating an allocation of power to a plurality of devices associated with a system controller;
receiving a cost-utility function for each device of the plurality of devices, each cost-utility function including a model representing one or more operations of a corresponding device over a time period of multiple time periods, and wherein each cost-utility function includes a first multiplier and a second multiplier;
after reception of the power allocation data and the cost-utility function and during a first time period of the multiple time periods:
receiving operation request data indicating a request to operate a device of the plurality of devices; and
in response to reception of the request to operate:
modeling operation of the plurality of devices to generate a set of results for a second time period of the multiple time periods, wherein operation of each device of the plurality of devices is modeled based on the power allocation data, the operation request data, and each cost-utility function, and wherein the first multiplier has a first value corresponding to the first time period and the second multiplier has a second value corresponding to the first time period;
adjusting the first multiplier from the first value to a third value associated with the set of results, the third value corresponding to the second time period;
adjusting the second multiplier from the second value to a fourth value associated with the set of results, the fourth value corresponding to the second time period; and
scheduling for the second time period, based on the first multiplier and the second multiplier, operation of at least the device.

11. The method of claim 10, further comprising:
determining a particular demand for each load device of a plurality of load devices based on a corresponding modelled operation of the load device;
determining a particular supply for each power generator of a plurality of power generators based on a corresponding modelled operation of the power generator, and
comparing an aggregated demand of the plurality of load devices and an aggregated supply for the plurality of power generators.

12. The method of claim 10, wherein modeling the operation includes modeling operation of a particular device using a shortest path analysis to estimate a shortest path from a current operational state to a desired operational state, and wherein adjusting the first multiplier or the second multiplier comprises performing a sub-gradient analysis.

13. The method of claim 12, wherein the shortest path analysis is associated with a Bellman-Ford algorithm, and wherein modeling the operation includes iteratively alternating between the shortest path analysis and the sub-gradient analysis.

14. The method of claim 10, wherein the operation request data includes an expected request time period.

15. The method of claim 10, wherein the plurality of devices is associated with a power distribution system, and wherein the power distribution system comprises a vehicular power distribution system of a vehicle, and wherein the vehicle comprises one of a boat and an oil platform.

16. A non-transitory computer-readable medium comprising instructions that, when executed by a processor, cause the processor to perform operations including:
receiving power allocation data indicating an allocation of power to a plurality of devices associated with a system controller;
receiving a cost-utility function for each device of the plurality of devices, each cost-utility function including a model representing one or more operations of a corresponding device over a time period of multiple time periods, and wherein each cost-utility function includes a first multiplier and a second multiplier;
after reception of the power allocation data and the cost-utility function and during a first time period of the multiple time periods:
receiving operation request data indicating a request to operate a device of the plurality of devices; and
in response to reception of the request to operate:
modeling operation of the plurality of devices to generate a set of results for a second time period of the multiple time periods, wherein operation of each device of the plurality of devices is modeled based on the power allocation data, the operation request data, and each cost-utility function, and wherein the first multiplier has a first value corresponding to the first time period and the second multiplier has a second value corresponding to the first time period;
adjusting the first multiplier from the first value to a third value associated with the set of results, the third value corresponding to the second time period;
adjusting the second multiplier from the second value to a fourth value associated with the set of results, the fourth value corresponding to the second time period; and
scheduling for the second time period, based on the first multiplier and the second multiplier, operation of at least the device.

17. The non-transitory computer-readable medium of claim 16, wherein the operation of each load device of the plurality of devices is modeled in parallel.

18. The non-transitory computer-readable medium of claim 16, wherein the first multiplier corresponds to a sensitivity of using more or less power than is allocated to the device, wherein the second multiplier corresponds to a sensitivity of a price per unit of power, and wherein the second multiplier comprises a function of a cost associated with the first multiplier.

19. The non-transitory computer-readable medium of claim 16, wherein each load device of a plurality of load devices is associated with a corresponding qualitative description to mathematically model operation of the load device, wherein a particular qualitative description includes a particular utility function and a set of one or more constraints.

20. The non-transitory computer-readable medium of claim 19, wherein the set of one or more constraints include a state variable, a control variable, or a combination thereof.

* * * * *